United States Patent
Danforth (10) Patent No.: US 7,293,078 B2
(45) Date of Patent: Nov. 6, 2007

(54) SYSTEM AND METHOD FOR PROVISIONING A PROVISIONABLE NETWORK DEVICE WITH A DYNAMICALLY GENERATED BOOT FILE USING A SERVER

(75) Inventor: Andrew Danforth, Herndon, VA (US)

(73) Assignee: Time Warner Cable, a division of Time Warner Entertainment Company, L.P., Stamford, CT (US)

( * ) Notice: Subject to any disclaimer, the term of this patent is extended or adjusted under 35 U.S.C. 154(b) by 900 days.

(21) Appl. No.: 10/619,236

(22) Filed: Jul. 14, 2003

(65) Prior Publication Data

US 2005/0038880 A1    Feb. 17, 2005

(51) Int. Cl.
*G06F 15/177* (2006.01)
*G06F 15/16* (2006.01)

(52) U.S. Cl. .............. 709/222; 709/203; 709/219; 709/220; 713/2

(58) Field of Classification Search ........ 709/202–203, 709/217–222; 713/1–2, 100
See application file for complete search history.

(56) References Cited

U.S. PATENT DOCUMENTS

| | | | | |
|---|---|---|---|---|
| 5,974,547 A | * | 10/1999 | Klimenko | 713/2 |
| 6,898,703 B1 | * | 5/2005 | Ogami et al. | 713/2 |
| 6,954,852 B2 | * | 10/2005 | Burokas et al. | 709/222 |
| 7,000,231 B1 | * | 2/2006 | Gold | 713/2 |
| 7,054,924 B1 | * | 5/2006 | Harvey et al. | 709/220 |
| 7,107,326 B1 | * | 9/2006 | Fijolek et al. | 709/220 |
| 7,111,053 B1 | * | 9/2006 | Black et al. | 709/220 |
| 2002/0161868 A1 | * | 10/2002 | Paul et al. | 709/221 |
| 2003/0009657 A1 | * | 1/2003 | French et al. | 713/2 |
| 2003/0041235 A1 | * | 2/2003 | Meyer | 713/1 |
| 2004/0153531 A1 | * | 8/2004 | Gu | 709/222 |

OTHER PUBLICATIONS

B. Bahlman. On-the-Fly TFTP Server Specification. Dec. 1997 (as rev. Jan. 1998). Birds-eye.Net. birds-eye.net/technical_archive.

* cited by examiner

*Primary Examiner*—Bharat Barot
(74) *Attorney, Agent, or Firm*—Robert, Mardula & Wertheim, LLC

(57) ABSTRACT

A system and method for provisioning provisionable network devices with a dynamically created boot file using a server. A dynamic configuration server (DCS) generates one or more boot file templates, each boot file template comprising attributes having a name and value. A boot file request comprising a boot file template identifier is received by the DNS from a provisionable network device. The DCS uses the boot file template identifier to select a boot file template for the provisionable network device and to assign attribute values to the attributes of the selected boot file template. The boot file is used to provision the provisionable network device.

24 Claims, 5 Drawing Sheets

SYSTEM AND METHOD FOR PROVISIONING A PROVISIONABLE NETWORK DEVICE WITH A DYNAMICALLY GENERATED BOOT FILE USING A SERVER

FIELD OF INVENTION

The present invention relates in general to the provisioning of network devices. More specifically, the present invention provides system and method for provisioning provisionable network devices with a dynamically created boot file using a server.

BACKGROUND OF THE INVENTION

The modern cable network has evolved a long way from its humble beginnings. In 1948, the first community antenna system delivered television signals over twin-lead strung from house to house. In 1950, a coax system was built in which the coax cable was strung on utility poles. These systems were intended to solve reception problems caused by weak signals (rural areas) or by ghosting from multiple reflected signals (urban areas). In the seventies, communications satellites breathed new life into the cable industry by providing access to programming not otherwise available in the cable operator's service area.

Until recently, the cable network was still predominantly a vehicle for delivering entertainment. With the advent of the Internet and the rise in demand for broadband two-way access, the cable industry began to seek ways of utilizing its existing plant.

A major problem for a cable operator desiring to provide two-way digital service was the configuration of its network. Designed for one-way delivery of broadcast signals, the existing cable network topology was optimized for downstream (toward the subscriber) only service. New equipment would have to be added to the network to provide two-way communication. To reduce the cost of this equipment and to simplify the upgrade of the broadcast cable for two-way digital traffic, standards were developed for a variety of new cable-based services. The first of these standards, the Data Over Cable System Interface Standard (DOCSIS), was released in 1998. DOCSIS establishes standards for cable modems and supporting equipment.

PacketCable™ is another Cable Labs®-led project to define a common platform to deliver advanced realtime multimedia services over a two-way cable plant. The PacketCable architecture defines a platform to deliver Internet Protocol services over the DOCSIS access network. The first service defined for this platform is Voice-over-Internet Protocol (VoIP). The core set of PacketCable 1.0 specifications describe how to move the basic functions that are typically consolidated on a single, expensive Class 5 central office switch onto several general-purpose servers, which leads to a low-cost, highly flexible, scalable, distributed architecture. The PacketCable architecture is flexible and can be extended to support advanced real-time multimedia services, such as multi-person online gaming, video-conferencing, and others.

On Apr. 5, 2002, the CableHome™ 1.0 standard was released. ("CableHome" is a trademark of Cable Television Labs, Inc.) The CableHome standard establishes a common architecture for the provision of new services to residential customers, simplifies the management the home network, and protects copyrighted information from being diverted to other uses.

One common attribute of each of these standards is the requirement that certain devices connected to the cable network be "provisioned" before those devices may be operated on the network. Provisioning involves a process by which a "provisionable device" is initialized, authenticated, registered, and configured to operate with a cable network. A provisionable network device receives a boot file as part of the provisioning process. By way of illustration and not as a limitation, a provisionable network device may be a DOCSIS-compliant cable modem (DCCM) or a media terminal adapter (MTA).

Figure 1:
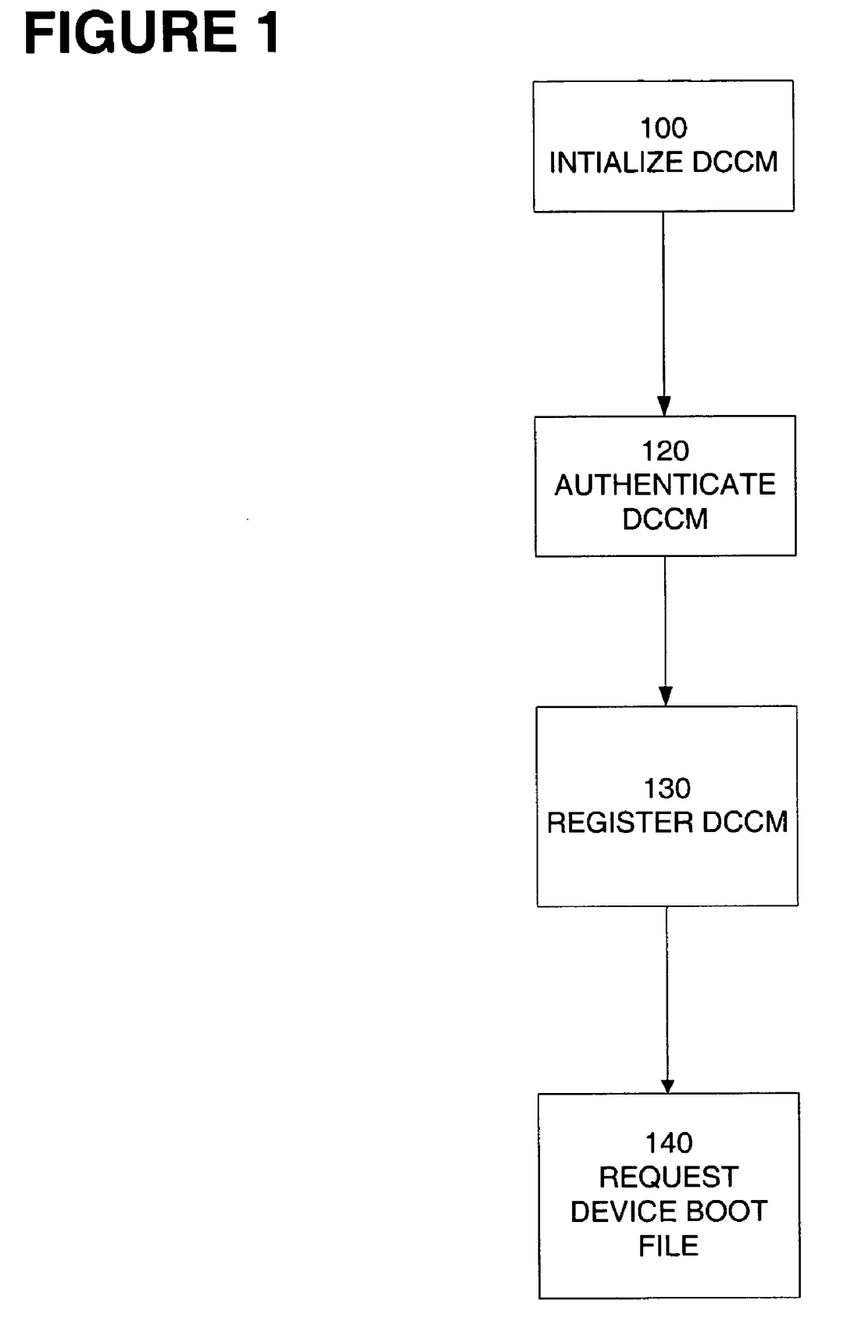
FIG. 1 illustrates the provisioning of a DOCSIS-compliant cable modem.

Referring to FIG. 1, the provisioning of a DCCM with a boot file is illustrated. Each time a DCCM is powered-on or reset, it must be initialized 100 through a series of "handshakes" and transfers of data between itself and a cable modem termination system (CMTS) at the cable headend. Following initialization, the DCCM is then authenticated 120 to confirm that the DCCM is entitled to receive service. The next provisioning step is registration 130, where the DCCM is configured as an Internet device. During this process, the DCCM synchronizes its clock with that of the CMTS and obtains an Internet protocol (IP) address from a Dynamic Host Configuration Protocol (DHCP) server. The DHCP server also provides the DCCM the network address of a Trivial File Transfer Protocol (TFTP) server and where a device boot file for that modem can be found and downloaded. The DCCM requests its device boot file 140 by the sending the TFTP a request message comprising a device boot file filename. Upon receipt of the boot file, the DCCM sends a registration request (REG-REQ) to the CMTS. This REG-REQ includes the current service identification (SID), IP address, operational parameters, upstream and downstream channel IDs, time stamps, and other configuration settings. If the information is accepted, the CMTS responds with a new SID and completes the registration process.

Under the PacketCable specifications, VoIP services are provide via an MTA. The MTA comprises the interface to a physical voice device, a network interface, CODECs, and all signaling and encapsulation functions required for VoIP transport, class features signaling, and QoS signaling. The MTA is provisioned so as to obtain its IP configuration required for basic network connectivity, announce itself to the network, and download of its boot file data from its provisioning server. Provisioning includes adding, deleting and modifying subscriber services on one or more endpoints of the embedded-MTA.

The MTA device is required by the PacketCable specification to verify the authenticity of the configuration file it downloads from the server. Further, the back office applications is require support a "flow-through" provisioning mechanism that synchronizes all device provisioning information on the MTA with the appropriate back office databases and servers. Synchronization is required in the event that provisioning information needs to be recovered in order to re-initialize the device. At a minimum, the back office and the MTA must synchronize customer records and the MTA configuration file.

In a DOCSIS environment, the device boot file typically comprises device attributes that are expressed in type-length-value (TLV) format and information necessary for the DOCSIS device to operate on the cable network to which it is connected. By way of illustration, for a DCCM the attributes identified by the DOCSIS standard include the maximum upstream and downstream data rates (based on the service level to which the customer has subscribed), the number of devices supported by the DCCM that require IP addresses, and information necessary to identify and authenticate the DCCM to the cable network. The device boot file is received by the DCCM in binary format. The DCCM uses the device boot file to populate device attributes with specific values.

Typically, DOCSIS device boot files are stored in a file library on a server. A device boot file is created for each possible configuration of a provisionable network device. The permutations of the various service levels coupled with other subscriber-specific elements makes management of this library a significant task. Additionally, large networks must maintain multiple file library servers, requiring that all servers be updated with changes to the file library. In order to establish a new configuration for a device, even for a single customer, a new device boot file must be added to the file library and populated to all of the file library servers.

As previously described, devices used to provide other services require device boot files. For example, voice over Internet protocol (VoIP) service meeting the PacketCable standard is supported by a media terminal adapter (MTA) that connects to the DCCM. The MTA has a device boot file specified by the PacketCable standard. Additionally, because the MTA requires its own network (IP) address, the DCCM device boot file must be modified to reflect that the DCCM supports two addressable devices (the computer to which it is connected and the MTA).

As more data services are made available to subscribers, the number of permutations of possible configurations increases requiring the cable operator to maintain larger configuration libraries. The size of the configuration library not only burdens the cable operation from a network management perspective, but also limits its ability to provide services that are customized at the subscriber level.

Not all configurable equipment used in a cable network is subject to industry standards. Routers, for example, are configured using conventions established by their manufacturers. In a large network, a service provider typically maintains routers having custom configuration settings for large commercial customers. Maintaining and changing these configuration settings manually, especially in networks utilizing non-standardized equipment of multiple manufacturers, is time consuming and subject to error.

In "On-The-Fly TFTP Server Specification," by Bruce Bahlmann (http://www.birds-eye.net/technical_archive/otf-tftp.htm) (herein, "Bahlmann"), problems associated with using TFTP with a large number of unique or shared device boot files are identified. Bahlmann proposes that the device boot file "could be built on-the-fly (preferably in memory) bypassing problems of scaling local storage, updates, and redundancy for configuration files needed to support large numbers of subnets (greater than 50)." Bahlmann also describes a means of structuring a boot file request to convey specific device parameters using the file path and file name.

Bahlmann does not identify how an "On-the-Fly" TFTP server converts the device parameters into a device configuration file or how the files within the "On-the-Fly" TFTP server would be constructed and maintained. Additionally, while Bahlmann discusses configuration of provisionable network devices other than cable modems using a Lightweight Directory Access Protocol (LDAP), the structure of an LDAP schema to accomplish this objective is not specified.

What would be useful is a system and a method for dynamically generating and providing a device boot file to a provisionable network device. The particular device attributes and values of those attributes in the device boot file would be selected based on a boot file identifier included in a boot file request.

SUMMARY OF THE INVENTION

An embodiment of the present invention is a system for provisioning a provisionable network device with a boot file. The system comprises a dynamic configuration server (DCS) adapted to generate one or more boot file templates, wherein each of the bootfile templates comprises one or more attributes associated with the provisionalbe network device. The DCS received a boot file request from the provisionable network device via a communication link. The boot file request comprises a boot file template identifier for selecting the boot file template for the provisionable network device and for assigning values to the boot file template attributes. The boot file is sent via the communication link to the provisionable network device and is used to provision the provisionable network device.

It is therefore an aspect of the present invention to dynamically create a device boot file for a provisionable network device from a library of device attributes.

It is yet another aspect of the present invention to create a device boot file in response to a boot file request.

It is a further aspect of the present invention to convert device parameters into a device configuration files for subsequent use in provisioning the device.

It is still another aspect of the present invention to determine the value of device attributes used in a device boot from a boot file identifier submitted with a boot file request.

It is further aspect of the present invention to determine the value of device attributes used in a device boot based on the physical address of the provisionable network device to be configured.

It is another aspect of the present invention to dynamically configure a provisionable network device using a TFTP protocol.

It is still another aspect of the present invention to dynamically provision a DCCM with a TFTP timestamp and a provisioned modem IP address.

Yet another aspect of the present invention is to provide means for improving the security of provisionable network devices by providing for dynamic creation of device boot files.

These and other aspects of the present invention will become apparent from a review of the general and detailed descriptions that follow. An embodiment of the present invention is a system and method for or provisioning a provisionable network device with a boot file. The system comprises a dynamic configuration server (DCS) adapted to generate one or more boot file templates, wherein each of the bootfile templates comprises one or more attributes associated with the provisionable network device. The DCS is further adapted to receive a boot file request from the provisionable network device via a communication link. The boot file request comprises a boot file template identifier. The DCS is adapted select the boot file template for the provisionable network device and to assign each attribute of the selected boot file template an attribute based on the boot file template identifier. DCS is adapted to send the boot file via the communication link to the provisionable network device and to provision the provisionable network device. In an embodiment of the present invention, the boot file template identifier is a file name. However, this is not meant as a limitation. Other means of identifying the boot file template and conveying attribute values to the DCS may be used without departing from the scope of the present invention. For example, in another embodiment of the present invention, the boot file template identifier is a MAC address associated with an attribute value record.

Another embodiment of the present invention is a method for provisioning a provisionable network device with a boot file. The method comprises generating one or more boot file templates, wherein each boot file template comprises one or more attributes associated with the provisionable network device, and receiving a boot file request from the provisionable network device via a communication link. The boot file request comprises a boot file template identifier, which is used to select a boot file template and to assign each of the one or more attributes of the selected boot file template an attribute value based so as to create the boot file. The boot file is sent to the provisionable network device via the communication link so as to provision the provisionable network device with the boot file.

In another embodiment, the boot file template identifier is a boot file filename. A hash of the boot file filename is computed. The computed hash value is compared to indexed hash values in an indexed hash table. Each indexed hash value is associated with one boot file template. If the computed hash value matches an indexed hash value, the boot file template associated with the indexed hash value is selected. If the computed hash value does not match an indexed hash value, at attempt is made to locate the boot file template using the boot file filename. If a boot file template is located using the boot file filename, that boot file template is selected and the computed hash value is added to the indexed hash table in association with that boot file template.

BRIEF DESCRIPTION OF THE DRAWINGS

A better understanding of the present invention will be realized from the detailed description that follows, taken in conjunction with the accompanying drawings, in which.

DETAILED DESCRIPTION OF THE INVENTION

The description of the present invention that follows utilizes a number of terms and phrases the definitions of which are provided below for the sake of clarity and comprehension:

| | |
|---|---|
| Attribute: | A configurable parameter of a provisionable network device having a name (or type) and a value included in a boot file. The attribute value determines some aspect of the operation of the provisionable network device on the network to which it is connected. |
| Boot File | A binary file comprising attributes and attribute values for a configurable network device. For a cable modem, such as Maximum Downstream and Upstream Rates, Burst Rate, Class of Service or Baseline Privacy, SNMP MIBs and other parameters. |
| DOCSIS: | Data Over Cable System Interface Standard |
| IP | Internet Protocol |

-continued

| | |
|---|---|
| MAC | Media Access Control (layer 2 unique address for devices) |
| MIC | A "message integrity check" the value of which is a hash of attributes (type and value) plus a shared key or "secret." |
| Provisionable Network Device | A device connected to a network that is designed to receive operating parameters, including attributes included in a boot file. |
| SNMP | Simple Network Management Protocol |
| TFTP | Trivial File Transfer Protocol (IP file transfer mechanism) |
| TLV | Type - Length - Value encoding structure. |

An embodiment of the present invention is a method for dynamically generating and providing a device boot file to a provisionable network device. The particular device attributes and values of those attributes in the device boot file are selected based on a boot file identifier included in a boot file request.

Figure 2:
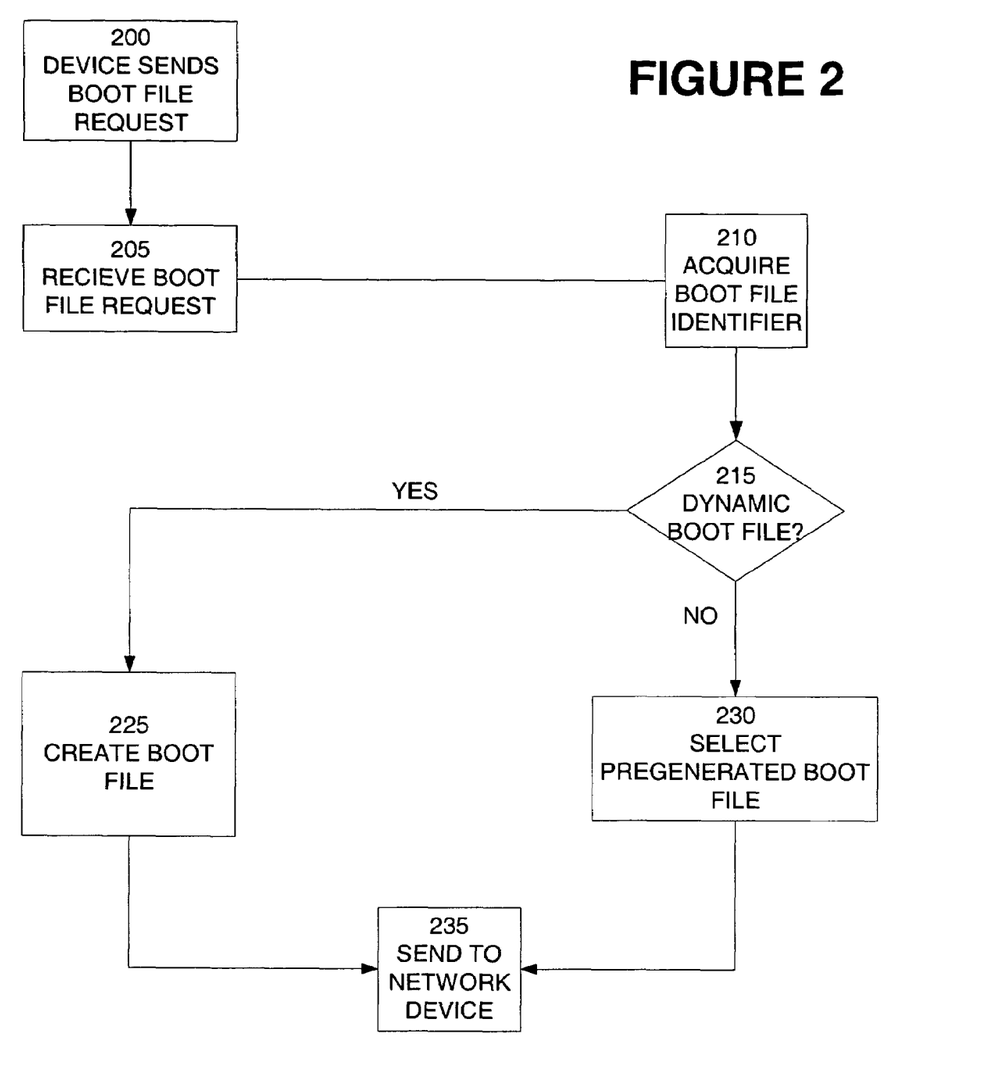
FIG. 2 illustrates a general flow of a method of dynamically generating a device boot file according to an embodiment of the present invention.

Referring to FIG. 2, a general flow of a method of dynamically generating a device boot file according to an embodiment of the present invention is illustrated. A provisionable network device sends a boot file request 200 to a dynamic configuration server (DCS). The boot file request comprises a boot file identifier and is received by the DCS 205. The boot file identifier is parsed 210 and, based on the boot file identifier, a determination is made as to whether the request is for a dynamically generated device boot file or a static device boot file 215. If the device boot file is static it is retrieved 230 and sent to the provisionable network device 235. If the device boot file is to be dynamically generated, the device boot file is created 225 and sent to the provisionable network device 235.

Figure 3:
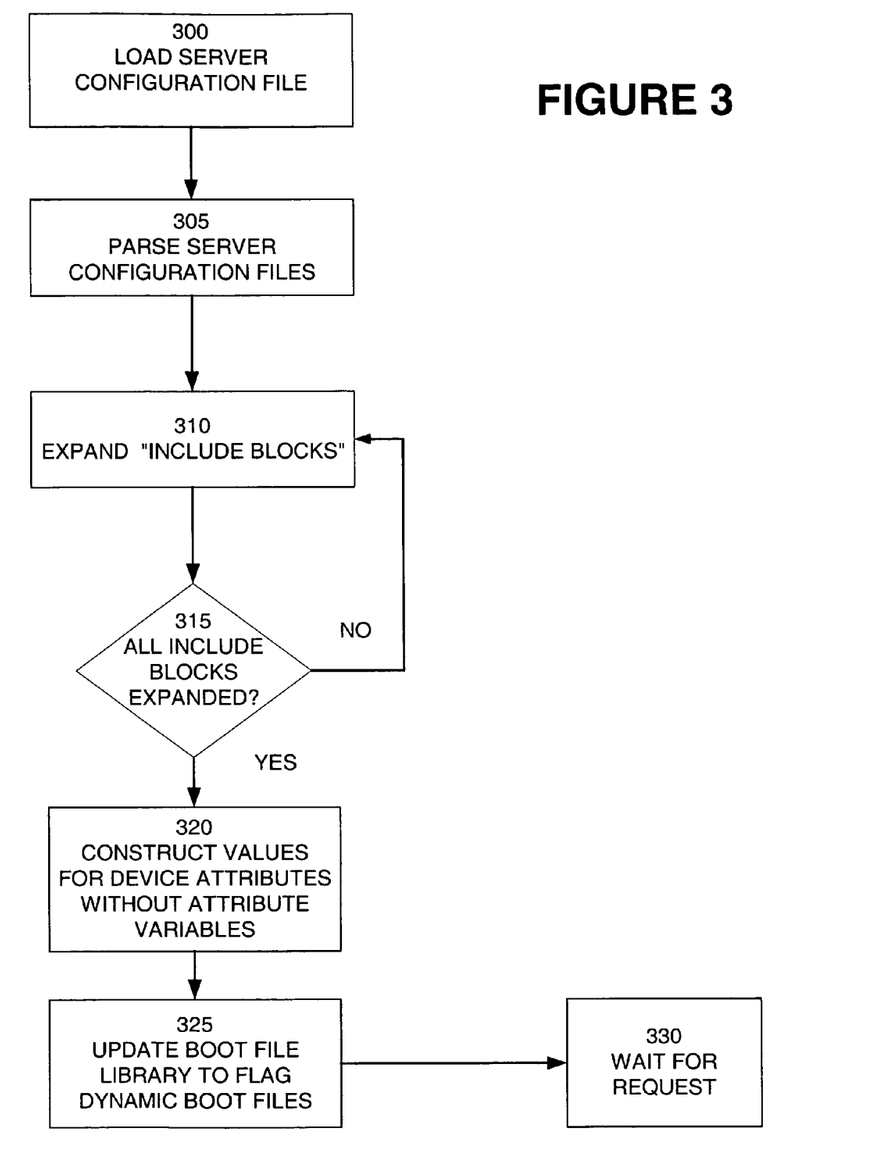
FIG. 3 illustrates the process by which a Dynamic Configuration Server (DCS) is initialized according to an embodiment of the present invention.

Referring to FIG. 3, the process by which a DCS is initialized according to an embodiment of the present invention is illustrated. In this embodiment, the DCS uses a trivial file transfer protocol (TFTP). However, this is not meant as a limitation. As will be apparent to those skilled in the art, any file transfer protocol may be used to perform the tasks assigned to the DCS without departing from the scope of the present invention.

The DCS loads a server configuration file 300 and parses the server configuration file 305 to construct a boot file library. Following the parsing of the server configuration file, the boot file library comprises a directory of device boot file templates each of which comprises a set of device attributes that define a particular implementation of the device boot file. By way of illustration and not as a limitation, in a DOCSIS environment device attributes are defined in the DOCSIS standard. For a DCCM, device attributes include bandwidth, maximum CPE, and network access control (on/off). However, this is not meant as a limitation. As will be apparent to those skilled in the art, device boot files for other environments may be constructed using the device attributes associated with devices typical of those environments without departing from the scope of the present invention.

The device attributes may be further described by attribute variables or by "include blocks." An include block further defines a device attribute and may include other include blocks, device attributes, and attribute variables. The use of include blocks allows various device boot files to share common device attribute definitions without the need to repeat the elements that make up the definition. An attribute variable is a referenced value that determines the value of the device attribute.

The DCS processes each device boot file in the boot file library 310 and expands the include blocks. Because include blocks may be nested, a determination is made whether all of the include blocks have been expanded 315. If not, another pass is made 310 through each device boot file in the boot file library. Once all of the include blocks have been expanded, the DCS constructs values for those device attributes that do not have attribute variables 320. If an attribute variable is detected in a device boot file, the boot file library is updated 325 to identify that boot file template as "dynamic" in that the content of the device boot file cannot be determined until the boot file request is received. A dynamic device boot file may thus be viewed as boot file template that is used to construct a device boot file from the value assigned to each attribute variable in the boot file request sent by the provisionable network device. The DCS then awaits a boot file request from a device 330.

In an embodiment of the present invention, the DCS provides boot files for DOCSIS-compliant cable modems (DCCMs). Under the DOCSIS standards, a Message Integrity Check (MIC) comprising a Message Digest 5 (MD5) hash of the contents of the boot file and a shared secret (that is, shared between the DCS and the CMTS) is required. MD5 is a one-way (non-reversible) hash—meaning that the input cannot be recovered from the output—and the output is considered unique for a specific input. If the MIC is not correct, the cable modem registration process fails and it will not be allowed to come on line. In this embodiment, the DCS calculates the MIC for each boot file identified in the boot file library that does not have attribute variables. The MIC for a boot file is appended to the boot file as specified in the DOCSIS standard.

Figure 4:
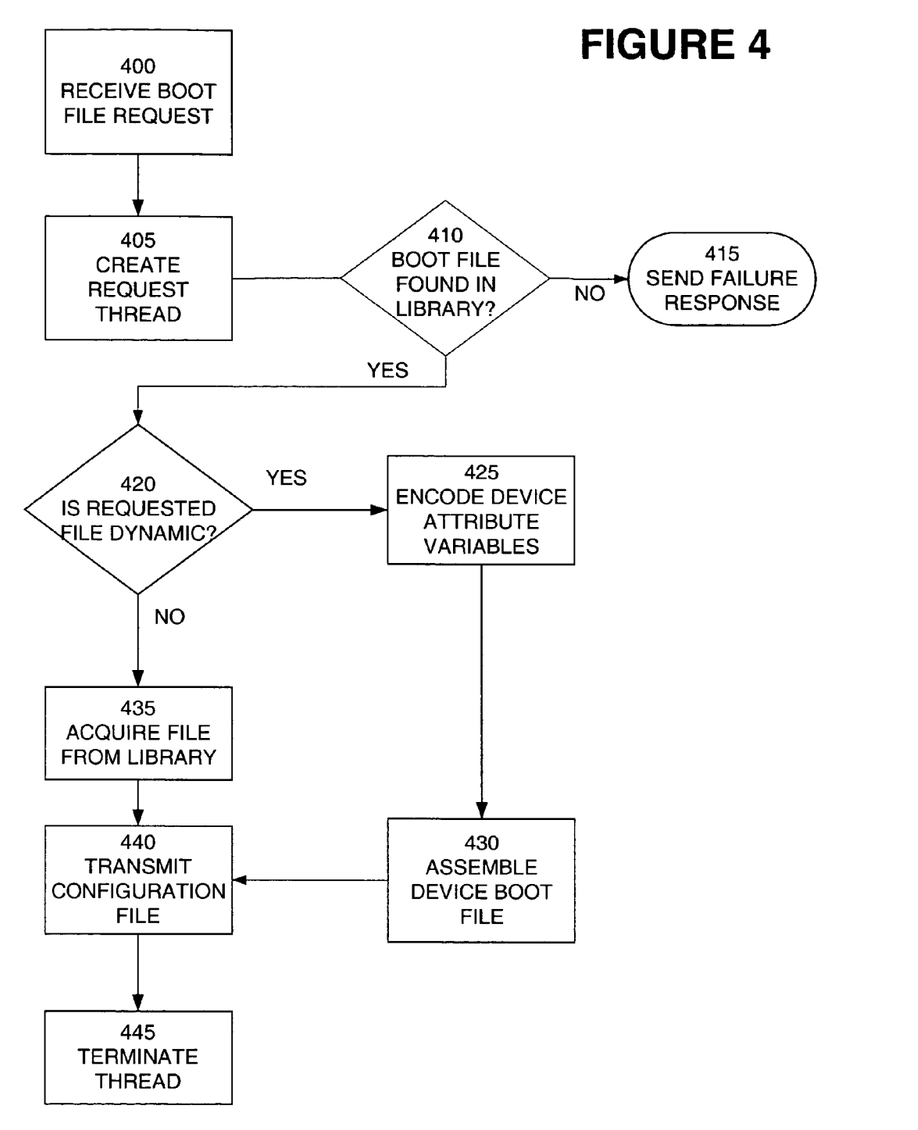
FIG. 4 illustrates a boot file request process according to an embodiment of the present invention.

FIG. 4 illustrates a boot file request process according to an embodiment of the present invention. Referring to FIG. 4, a device boot file request is received at the DCS 400. The boot file request includes a boot file identifier that identifies the device boot file template being requested. In the embodiment of the present invention illustrated in FIG. 4, the boot file identifier is a filename. However, this is not meant as a limitation. In an alternate embodiment, the boot file identifier is associated with a provisionable network device through a unique device identifier. The unique device identifier is used to determine the device boot file template and the attribute values appropriate for the provisionable network device. By way of illustration, and not as a limitation, the unique device identifier is the device MAC address that is associated with a attribute value table.

The DCS creates a request thread 405. In an embodiment of the present invention, the DCS determines if the boot file identifier in the boot file request is associated with a boot file template in the boot file library 410.

In an embodiment of the present invention, the boot file identifier is a boot file filename. In this embodiment, the association of the boot file identifier with a boot file template in the boot file library is accomplished by determining if the requested boot file filename matches any boot file template filename in the boot file library. In an alternate embodiment, a hash table is used to accelerate the matching processing.

Figure 5:
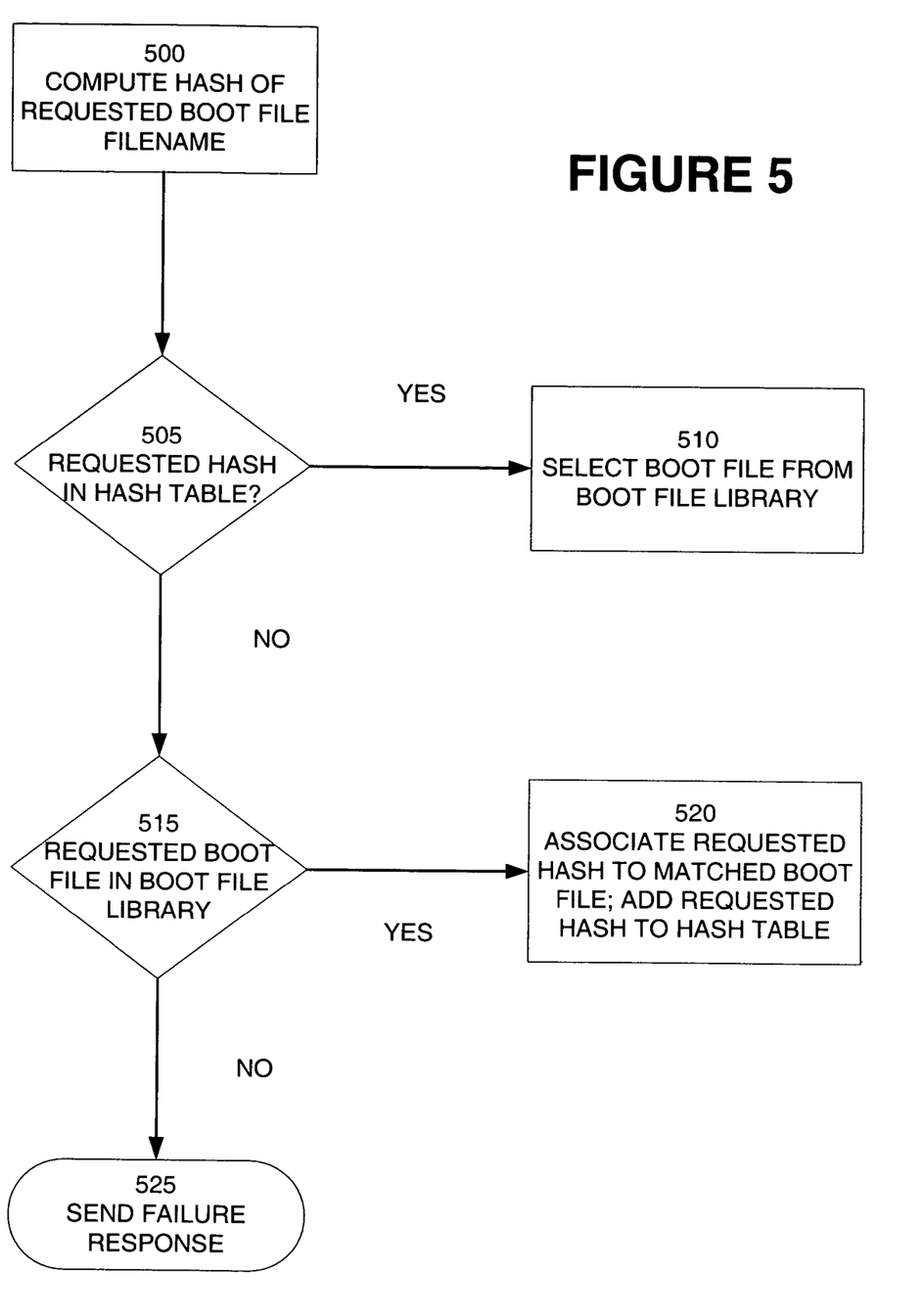
FIG. 5 illustrates the use of a hash table to match boot file templates with boot file filenames according to an embodiment of the present invention.

FIG. 5 illustrates the use of a hash table to match boot file templates with boot file filenames according to an embodiment of the present invention. The hash table associates a hash value of a requested boot file filename (request hash) with a boot file template filename in the boot file library. This association is "learned." A request hash is calculated 500. A request hash value is compared to a list of hash values stored in a hash table 505. If the request hash value is found in the hash table, the boot file template filename associated with the hash value found in the hash table is selected 510 from the boot file library. If the request hash value is not found in the hash table, the filename of the requested boot file is matched 515 by direct comparison of the filename of the requested boot file with each boot file template filename in the boot file library. If the requested boot file is not found in the boot file library, a failure response is sent to the provisionable network device that sent the boot file request. If the requested boot file template is found in the boot file library, the request hash value is added 520 to the hash table and is associated with the boot file template filename of the matched file in the boot file library. The next time the same boot file template filename is requested, the request hash value will be found in the hash table and the boot file template filename associated with the request hash will be selected from the boot file library.

Referring again to FIG. 4, if the boot file identifier in the boot file request is not associated with a boot file template in the boot file library 410, a request denied response 415 is returned to the device from which the boot file request was received. If a boot file template is associated with the boot file identifier, the DCS checks a flag to determine if the associated boot template is dynamic 420. If the associated boot file template is not dynamic, the associated boot file template is acquired from the boot file library 435. If the associated boot file is dynamic, the DCS identifies the attribute variables in the associated boot file request and encodes each attribute variable with the value of that attribute variable 425.

In an embodiment of the present invention, the value of each attribute variable is determined from the boot file identifier included in the boot file request. In an alternate embodiment of the present invention, the value of each attribute variable is associated with the provisionable network device by the unique device identifier. In this embodiment, the unique device identifier is used to access a datastructure and to look up the value of each attribute variable required by the matched boot file template. The device boot file is assembled 430. At this point, the device boot file (whether copied from the configuration file library or created dynamically) is transmitted to the provisionable network device that requested it 440. The DCS terminates the request thread 445.

In an embodiment of the present invention the device requesting the provisionable network device boot file is a DOCSIS-compliant device. In this embodiment, in addition to the encoding of the attribute variables, the MIC values for the dynamic boot file are calculated and appended to the boot file in accordance with the DOCSIS standard.

In an embodiment of the present invention, the boot file filename comprises an expression substring based on rules associated with a naming convention. An exemplary naming convention for a DCCM is shown below:

<ISP Code>ip<CPE #>bw<Bandwidth Code>.bin Where:

| ATTRIBUTE | ATTRIBUTE VALUE |
| --- | --- |
| <ISP Code> | A four-character code designating the ISP in a multiple ISP environment. |
| <CPE #> | One or more digits designating the number of CPEs that will be allowed to request DHCP IP addresses behind the cable modem. |
| <Bandwidth Code> | One or more digits specifying the bandwidth code for tiered services. |

By way of illustration, an example of a boot file filename constructed using this name convention is:

isrrip1bw1.bin, where the Internet Service Provider is "ISRR", the number of permitted addressable devices supported by the provisionable network device being configured is "1", and the bandwidth code is "1."

The naming convention illustrated above is not meant as a limitation. As will be apparent to those skilled in the art, additional device attributes may be captured in the boot file filename and other naming conventions may be used without departing from the scope of the present invention.

As previously described, according to an embodiment of the present invention, the DCS matches the requested device boot file filename with a boot file template in a boot file library. The requested boot file template may be dynamic, in which case the device boot file is constructed based on the parameters included with the boot file request. In an embodiment of the present invention, the values needed to dynamically create the requested device boot file are included in an expression substring of the requested device boot file filename. For example, the "CPE#" attribute described above may be identified in the boot file filename in the boot file library as "ip([123456789] | [0123456])." This string indicates that value of "CPE" may be 1 through 9 or 10-16. The device boot file would reflect this device attribute as "maximum_cpe $1", where $1 represents the value actually established for the CPE attribute in the boot file identifier. Thus, if the boot file identifier included the notation "ip8," the attribute variable $1 would be replaced by the attribute value "8."

In another embodiment, the device boot file request comprises a boot file identifier in the form:

filename@0a0102030405, where the value following the @ sign is the MAC address of the provisionable network device requesting the device boot file.

In this embodiment, the DCS uses the MAC address to retrieve values of each attribute variable in the device boot file from a datastructure associated with the MAC address. In another embodiment, the DCS receives a file of attribute variable values associated with a MAC address before the provisionable network device associated with that MAC address requests a device boot file. In this embodiment, the DCS pre-constructs the device boot file before receiving a boot file request from the provisionable network device.

In another embodiment, the device attributes that pertain to a particular provisionable network device are stored in one of a number of different data sources including a flat file, an SQL database, LDAP, or a local binary database. In another embodiment, the DCS supports plug-in modules to create additional methods of database lookups. The DCS constructs the requested device boot file and sends it to the requesting provisionable network device.

In another embodiment, the DCS is configured to provide device boot files to DCCMs. In this embodiment, optional DCCM device attributes "timestamp" and "server_provisioned_modem_address" (SPMA) are set to "on." The timestamp attribute comprises an attribute value representing the local time of the DCS when the device boot file was request was received. The timestamp attribute can be used as an additional security check by the CMTS when a DCCM presents the attribute values during the registration process. The SPMA attribute comprises an attribute value representing the IP address of DCCM that sent the boot file request and offers an additional security check by the CMTS. These attributes are not used in pre-generated static boot file libraries because the associated attribute values are not known in advance of the receipt of the boot file request.

Thus, requiring these attributes makes every boot file held in the boot file library a dynamic file. As previously noted, current means of provisioning boot files to DCMMs are not capable of handling dynamic creation of boot files in a scalable fashion. The present invention thus provides means to improve the security of cable networks by permitting these dynamic device attributes to be implemented.

In yet another embodiment of the present invention, the DCS is configured to communicate with a registration server whenever a change is made at the DCS to an attribute value that is useful or necessary to the operation of the registration server. By way of illustration and not as a limitation, the DOCSIS standards require that a MIC to be included to the boot file sent to the DCCM. The boot file is sent by the DCCM to the CMTS (the registration server) in the REG-REQ message. Because the CMTS and the DCS are both privy to the shared secret used to compute the MD-5 hash of the boot file, the CMTS can compute the MIC from the received boot file and verify that it came from an authorized DCS. While this provides a measure of security, the shared secret is not immune from discovery. Routinely changing the shared secret substantially improves the security of the boot file exchange. However, this requires synchronization between the DCS and the CMTS so that both servers use the same shared secret.

Currently, updating shared secret in the CMTS is a manual process fraught with possibilities for human error. An operator typically manually logs into each of the CMTSs one after another to update the shared secret value. Most CMTSs in use today permit up to two shared secrets to be stored at one time. If the CMTSs used by an MSO permit only one shared secret to be stored, the shared secret is first removed from the CMTS. The CMTS will then ignore the MIC and continue to register CMs, albeit without the security offered by the shared secret and the MIC. The old shared secret on the DCS is replaced with a new shared secret. Finally, the new shared secret is added to the CMTS.

If the CMTSs used by the MSO allow two shared secrets to be stored, the new shared secret will be stored on the CMTS leaving the original parameter value in place. Once all of the CMTSs are configured with the old and new parameter values, the boot file server configuration is changed so that the new parameter value is used. Then the old shared secret value is removed from each CMTS supported by the DCS. Due to the manual nature of the process, mistakes are unavoidable, resulting in service problems, inefficient use of engineering time, and a bias against modification of provisioning parameters. Further, until all of the CMTSs have been updated with the new shared secret, some registration requests will be accepted using an old, and possibly compromised, shared secret.

In an embodiment of the present invention, a change made in the value of shared secret on the DCS is securely communicated to each CMTS served by the DCS. The configuration of the CMTS can be performed through SNMP commands or through proprietary command-line parameters.

A system and method for dynamically creating and sending device boot files has been described. It will be understood by those skilled in the art of the present invention may be embodied in other specific forms without departing from the scope of the invention disclosed and that the examples and embodiments described herein are in all respects illustrative and not restrictive. Those skilled in the art of the present invention will recognize that other embodiments using the concepts described herein are also possible.

I claim:

1. A system for provisioning a provisionable network device with a boot file comprising:
   a communication link; and
   a dynamic configuration server (DCS) connected to the communication link, the DCS configured to:
      generate a boot file template, wherein the boot file template is associated with a boot file template identifier and wherein the boot file template comprises an attribute associated with the provisionable network device;
      receive a boot file request from the provisionable network device via the communication link, wherein the boot file request comprises the boot file template identifier and an attribute value associated with the attribute;
      select the boot file template based on the boot file template identifier;
      extract the attribute value from the boot file request;
      create a boot file by assigning the attribute value in the boot file request to the attribute of the template; and
      send the boot file via the communication link to the provisionable network device, wherein the provisionable network device is provisioned with the boot file.

2. The system of claim 1, wherein the communication link is an IP network.

3. The system of claim 1, wherein the DCS is a TFTP server.

4. The system of claim 1, wherein the boot file template identifier is a boot file filename.

5. The system of claim 4, wherein the DCS comprises a table of indexed hash values and wherein the DCS is further configured to:
   compute a hash value of the boot file filename;
   make a determination whether the computed hash value matches an indexed hash value on the indexed hash table; and
   if the computed hash value matches an indexed hash value on the indexed hash table, then select the boot file template associated with the indexed hash value.

6. The system of claim 4, wherein the DCS comprises a table of indexed hash values and wherein the DCS is further configured to:
   compute a hash value of the boot file filename;
   make a first determination whether the computed hash value matches one of the indexed hash values on the indexed hash table;
   if the computed hash value does not match one of the indexed hash values on the indexed hash table, then make a second determination whether the boot file filename identifies the boot file template; and
   if the boot file filename identifies the boot file template, then select the boot file template identified by the boot file filename, associate the computed hash value with the selected boot file template, and add the computed hash value to the indexed hash table.

7. The system of claim 1, wherein the provisionable network device is a DOCSIS-compliant device.

8. The system of claim 1, wherein the provisionable network device is a PacketCable compliant device.

9. The system of claim 1, wherein the provisionable network device is a CableHome compliant device.

10. The system of claim 1, wherein the provisionable network device is selected from the group consisting of a router, a modem, a computer, a switch, a printer and a server.

11. The system of claim 1, wherein the provisionable network device is connected to a network and wherein the DCS is further configured to:
   generate a first message integrity check (MIC) by computing a hash of the attributes and the attribute values of the boot file and a shared key; and
   append the first MIC to the boot file, wherein the system further comprises a network registration server configured to:
   receive the boot file from the provisionable network device;
   generate a second MIC by computing a hash of the attributes and the attribute values as received by the registration server and the shared key;
   make a determination if the first MIC and the second MIC are the same;
   if the first MIC and the second MIC are the same, then register the provisionable network device with the network thereby allowing the provisionable network device to operate on the network.

12. The system of claim 11, wherein the DCS is further configured to:
   determine if the shared key has changed; and
   if the shared key has changed, then communicate the shared key to the network registration server.

13. A method for provisioning a provisionable network device with a boot file comprising:
   generating boot file template, wherein the boot file template is associated with a boot file template identifier and wherein the boot file template comprises an attribute associated with the provisionable network device;
   receiving a boot file request from the provisionable network device via a communication link, wherein the boot file request comprises the boot file template identifier and an attribute value associated with the attribute;
   selecting the boot file template based on the boot file template identifier;
   extracting the attribute value from the boot file request;
   creating a boot file by assigning the attribute value in the boot file request to the attribute of the template;
   sending the boot file to the provisionable network device via the communication link; and
   provisioning the provisionable network device with the boot file.

14. The method for provisioning a provisionable network device with a boot file of claim 13, wherein the communication link is an IP network.

15. The method for provisioning a provisionable network device with a boot file of claim 13, wherein the DCS is a TFTP server.

16. The method for provisioning a provisionable network device with a boot file of claim 13, wherein the boot file template identifier is a boot file filename.

17. The method for provisioning a provisionable network device with a boot file of claim 16, wherein the DCS comprises a table of indexed hash values and wherein selecting the boot file template comprises:
   computing a hash value of the boot file filename;
   making a determination whether the computed hash value matches an indexed hash value on the indexed hash table; and
   if the computed hash value matches an indexed hash value on the indexed hash table, then selecting the boot file template associated with the indexed hash value.

18. The method for provisioning a provisionable network device with a boot file of claim 16, wherein the DCS comprises a table of indexed hash values and wherein selecting the boot template comprises:
computing a hash value of the boot file filename;
making a first determination whether the computed hash value matches one of the indexed hash values on the indexed hash table;
if the computed hash value does not match one of the indexed hash values on the indexed hash table, then making a second determination whether the boot file filename identifies the boot file template; and
if the boot file filename identifies the boot file template, then selecting the boot file template identified by the boot file filename, associating the computed hash value with the selected boot file template, and adding the computed hash value to the indexed hash table.

19. The method for provisioning a provisionable network device with a boot file of claim 13, wherein the provisionable network device is a DOCSIS-compliant device.

20. The method for provisioning a provisionable network device with a boot file of claim 13, wherein the provisionable network device is a PacketCable compliant device.

21. The method for provisioning a provisionable network device with a boot file of claim 13, wherein the provisionable network device is a CableHome compliant device.

22. The method for provisioning a provisionable network device with a boot file of claim 13, wherein the provisionable device is selected from the group consisting of a router, a modem, a computer, a switch, a printer, and a server.

23. The method for provisioning a provisionable network device with a boot file of claim 13, wherein the provisionable network device is connected to a network and wherein the method further comprises:
generating a first message integrity cheek (MIC) by computing a hash of the attributes and the attribute values of the boot file and a shared key;
appending the first MIC to the boot file;
sending the boot file from the provisionable network device to a network registration server;
at the network registration server, generating a second MIC by computing a hash of the attributes and the attribute values as received by the registration server and the shared key;
making a determination if the first MIC and the second MIC are the same; and
if the first MIC and the second MIC are the same, then registering the provisionable network device with the network thereby allowing the provisionable network device to operate on the network.

24. The method for provisioning a provisionable network device with a boot file of claim 23, wherein the method further comprises:
at the DCS, determining if the shared key has changed; and if the shared key has changed, then communicating the shared key to the registration server via the communications link.

* * * * *